United States Patent [19]

Eymans et al.

[11] E Re. 28,818

[45] Reissued May 18, 1976

[54] STABILIZED DIBENZOYL PEROXIDES POLYMER INITIATOR COMPOSITIONS

[75] Inventors: Jacobus Johannes Antonius Eymans, Deventer; Egbert Willem Holman, Zwolle; Hans Jaspers, Diepenveen, all of Netherlands

[73] Assignee: Akzona Incorporated, Asheville, N.C.

[22] Filed: Dec. 27, 1973

[21] Appl. No.: 428,773

Related U.S. Patent Documents

Reissue of:

[64] Patent No.: 3,723,336
Issued: Mar. 27, 1973
Appl. No.: 83,611
Filed: Oct. 23, 1970

[30] Foreign Application Priority Data

Oct. 27, 1969 Netherlands ..... 6916138

[52] U.S. Cl. ..... 252/186; 252/99; 260/610 R; 260/610 A

[51] Int. Cl.[2] ..... C01B 15/00; C08F 4/36

[58] Field of Search ..... 252/186, 99; 260/610 R, 260/610 A

[56] References Cited

UNITED STATES PATENTS

| | | | |
|---|---|---|---|
| 2,838,472 | 6/1958 | Lucas | 252/186 |
| 3,182,026 | 5/1965 | Leveskis | 252/186 |
| 3,324,040 | 6/1967 | Spoor | 252/186 |
| 3,507,800 | 4/1970 | Leveskis | 252/186 |

OTHER PUBLICATIONS

Condensed Chemical Dictionary, Seventh Edition, 1966, Van Nostrand Reinhold, p. 23.

*Primary Examiner*—Leland A. Sebastian
*Assistant Examiner*—Irwin Gluck
*Attorney, Agent, or Firm*—Stevens, Davis, Miller & Mosher

[57] ABSTRACT

A polymer initiator composition and method for its production are provided, the composition being non-separating and stable and including a substantial amount of a dibenzoyl peroxide and an effective amount of a hydrophobic alkyl group-containing silica in an amount sufficient to prevent the composition from physically separating into its components.

8 Claims, No Drawings

STABILIZED DIBENZOYL PEROXIDES POLYMER INITIATOR COMPOSITIONS

Matter enclosed in heavy brackets [ ] appears in the original patent but forms no part of this reissue specification; matter printed in italics indicates the additions made by reissue.

This invention relates to compositions and to a process for their preparation.

The compositions of the invention contain dibenzoyl peroxide or its ring-substituted derivatives; the compositions are characterized by the fact that they do not physically separate into their components on storage and further are capable of use as initiators in the copolymerization of unsaturated polyester resins from unsaturated polyesters and monomers containing one or more $CH_2{=}CH<$ groups, optionally in the presence of accelerators.

The invention is especially concerned with compositions and a process for preparing the compositions containing dibenzoyl peroxide or its ring-substituted derivatives which on storage are physically non-separating into their components and which are moreover pourable.

In the copolymerization of unsaturated polyester resins from unsaturated polyesters and monomers containing one or more $CH_2{=}CH<$ groups, solid organic peroxides, for example cyclohexanone peroxide, benzoyl peroxide and its derivatives, are used as catalysts. These peroxides are generally explosive and/or shock and impact-sensitive compounds and thus are preferably marketed not in their technically pure form but typically as pastes containing at least 40% by weight of a plasticizer, water or mixture thereof. Additional components may also be present such as dyes, pigments, and other additives.

Such pastes have the drawback that they have a very high viscosity, which can make it difficult to remove the pastes from storage vessels. Difficulty also is encountered when they are mixed into the unsaturated polyester resins which are to be copolymerized. Moreover, the prior art pastes may be pumped only with difficulty which is a disadvantage, for example, in the continuous polymerization of unsaturated polyester resins.

Accordingly, there is a technical need for compositions containing dibenzoyl peroxide or its ring-substituted derivatives which are easy to measure by pouring and quickly disperse homogeneously in polyester resins, and which are physically non-separating into their components when stored.

It has now been found that compositions containing in parts by weight about 20 to about 60 parts of dibenzoylperoxide or a ring-substituted derivative thereof;

up to about 20 parts of water; and a chemically inert plasticizer or a plasticizer admixed with a pigment, a dye or other additives will remain stable during storage and attain particularly rheological properties, if a hydrophobic, alkyl group-containing form of a silica is incorporated in these compositions in such an amount that separation is prevented.

As preferred alkyl groups may be mentioned lower alkyl groups such as methyl, ethyl, n-propyl, iso-propyl, iso-butyl, n-butyl, and tert-butyl.

The hydrophobic alkyl group-containing silica is the reaction product of a pyrogenic silica with dimethyl dichlorosilane according to the procedure set forth in German Auslegeschrift 1,163,784.

As an example of preferred hydrophobic alkyl group-containing silica is the methyl containing silica marketed under the trade name Aerosil R 972, which has the following characteristics:

| | | |
|---|---|---|
| Average particle size | m | 20 |
| Surface according to BET | $m.^2/g$ | 120±30 |
| Composition | percent $SiO_2+(-CH_3)$ | 99.8 |
| Carbon | percent | 1.1±2 |
| pH-value (4% dispersion in methanol/water 1:1) | | 3.8±2 |
| Apparent density,g./l | | About 30–50 |

As the derivatives of dibenzoyl peroxide may be mentioned the derivatives which contain conventional substituents of a polymer initiator such as halo, alkyl, and alkoxy. 2,4-dichlorobenzoyl peroxide, p-methoxybenzoyl peroxide are examples of ring-substituted derivatives of benzoyl peroxide for incorporation into the compositions according to the invention. As suitable inert plasticizers which may be used according to the invention may be mentioned tricresyl phosphate, phthalate plasticizers such as dimethyl, diethyl, dibutyl, diisobutyl, dioctyl, diisooctyl, butylbenzoyl and polyglycol phthalate, and also other plasticizers such as acetyltributyl citrate and epoxydised soya bean oil.

As previously noted, dyes and other additives may optionally be included in the compositions of the present invention. As typical dyes may be mentioned P.V. Echt Rot B, and Siccapol Rot A 001. Pigments which may be included are, for example, zinc oxide and titanium dioxide.

The rheological properties of the compositions according to the invention are determined by the quantity and the nature of the components. For instance, a composition containing about 40 parts by weight of dibenzoyl peroxide, 0–16 parts by weight of water, 2–6 parts by weight of the hydrophobic methyl group-containing silica hereinbefore described, and about 58–38 parts by weight of an inert plasticizer or about 58–38 parts by weight of plasticizer and additive, is non-separating and pourable. On the other hand, if this composition contains 16–20 parts by weight of water and 42–34 parts by weight of plasticizer or plasticizer and additive, it is non-separating but non-pourable.

A composition containing about 50 parts by weight of benzoyl peroxide, 0–10 parts by weight of water, 2–6 parts by weight of hydrophobic methyl group-containing silica and about 48–34 parts by weight of an inert plasticizer or a plasticizer and additive mixture is non-separating and pourable. On the other hand, if this composition contains 10–20 parts by weight of water and accordingly less plasticizer or plasticizer and additive, it is non-separating but pasty.

The compositions according to the invention may be obtained by mixing in a Nauta-mixer or other suitable mixer the peroxide, hydrophobic silica, and if desired, water, pigments and other additives, for a time sufficient to obtain a homogeneous mixture.

The following examples are given merely for the purpose of illustration, and are not intended to define the scope of the invention, reference being had to the appended claims for this purpose.

In the following examples the pourability is measured according to the following procedure: 400 g. of the omposition were put in a wide-necked 500 ml. bottle aving a diameter of 65 mm. and an outlet opening aving a diameter of 55 mm. After filling, the bottle as placed in an inverted position at an angle of 70 egrees with respect to the horizontal. After 1 minute, ne quantity of composition which had flowed out was eighed. The composition was considered pourable, if ne following criterion is met:

$$\frac{\text{weight of quantity flowing out}}{\text{filler weight}} \times 100\% \geq 75\%$$

The composition was considered physically stable if, fter storage for 8 weeks at room temperautre, not nore than 2 to 3% of plasticizer had separated.

Where a methyl-containing silica is referred to in the xamples, the above described Aerosil R 972 is conemplated ("Aerosil").

EXAMPLE I 34 g. of a methyl-containing silica was admixed with 16 g. of dibutyl phthalate. 135 g. of the resultant comosition was added to a mixture consisting of 425 g. of ibenzoyl peroxide and 75 g. of dibutyl phthalate and lended in a mixer at room temperature.

After homogenising on a roller, the remaining part of he Aerosil-dibutyl phthalate mixture was added to the omogenisate obtained, while vigorously mixing at oom temperature.

A pourable formulation was obtained having the ollowing composition by weight:

0% of dibenzoyl peroxide
% of methyl-containing silica
6% of dibutyl phthalate hich after storage for 8 weeks at room temperature ppeared to be still physically and chemically stable.

In an analogous manner, the stable and pasty compositions listed in Table A were obtained, where the symbol + indicates a satisfactory property.

TABLE A

| | Percent by weight | | | | | | |
|---|---|---|---|---|---|---|---|
| Composition: | | | | | | | |
| Dibenzoyl peroxide | 50 | 50 | 50 | 50 | 50 | 50 | 50 |
| Aerosil | 4 | 2 | 5 | 3 | 4 | 2 | 4 |
| Water | 0 | 2 | 2 | 7.5 | 1 | 16 | 16 |
| ZnO | | | 0.4 | | | 0.5 | 0.5 |
| Dibutyl phthalate | 46 | 46 | 42.6 | 39.5 | 45 | 31.5 | 29.5 |
| Pourability | + | + | + | + | + | − | − |
| Physical stability | + | − | + | + | + | + | + |

EXAMPLE II 68 g. of a methyl-containing silica was added with 676 g. of dibutyl phthalate. 130 g. of the resultant composition was admixed with a mixture consisting of 680 g. of dibenzoyl peroxide, 80 g. of water and 140 g. of dibutyl phthalate at room temperature. After mixing for 15 minutes, 7 g. of ZnO were added, followed by the addition of 45 g. of water, and finally the remaining part of the Aerosil-dibutyl phthalate mixture.

A pourable formulation was obtained having the following composition by weight:

40% of dibenzoyl peroxide
4% of Aerosil
48.1% of dibutyl phthalate
7.5% of water
0.4% of ZnO After storage for 8 weeks at 30° C. the composition appeared to be still chemically and physically stable.

In an analogous manner, the stable, pourable and pasty compositions listed in Table B were obtained.

TABLE B

| | Percent by weight | | | | | | | |
|---|---|---|---|---|---|---|---|---|
| Composition: | | | | | | | | |
| Dibenzoyl peroxide | 40 | 40 | 40 | 40 | 40 | 40 | 40 | 40 |
| Aerosil | 4 | 4 | 3 | 4 | 2 | 3 | 3 | 3 |
| Water | 0 | 1 | 7.5 | 12 | 16 | 20 | 7.5 | 7.5 |
| ZnO | | | 0.4 | 0.4 | 0.4 | 0.4 | | 0.4 |
| P.V. Echt Rot B | | | | | | | | 0.075 |
| Siccapol Rot A 001 | | | | | | | | 1 |
| Dibutyl phthalate | 56 | 55 | 49.1 | 43.6 | 41.6 | 36.6 | 48.5 | 48.1 |
| Pourability | + | + | + | + | + | − | + | + |
| Physical stability | + | + | + | + | + | + | + | + |

TABLE C

| | Percent by weight | | | | | | | | |
|---|---|---|---|---|---|---|---|---|---|
| Composition: | | | | | | | | | |
| Dibenzoyl peroxide | 40 | 40 | 40 | 40 | 40 | 40 | 40 | 40 | 40 |
| Aerosil | 4 | 3 | 3 | 4 | 3 | 4 | 3 | 4 | 3 |
| Water | 7.5 | 7.5 | 7.5 | 7.5 | 7.5 | 7.5 | 7.5 | 7.5 | 12 |
| ZnO | 0.4 | 0.4 | 0.4 | 0.4 | 0.4 | 0.4 | 0.4 | 0.4 | 0.4 |
| Dibutyl phthalate | 7.5 | 7.5 | 7.5 | 7.5 | 7.5 | 7.5 | 7.5 | 7.5 | 7.5 |
| Dimethyl phthalate | 40.6 | | | | | | | | |
| Dioctyl phthalate | | 41.6 | | | | | | | |
| Butylbenzyl phthalate | | | 41.6 | | | | | | 37.1 |
| Epoxydised soya bean oil | | | | 40.6 | | | | | |
| Polyglycol phthalate | | | | | 41.6 | | | | |
| Tricresyl phosphate | | | | | | 40.6 | | | |
| Acetyltributylcitrate | | | | | | | 41.6 | | |
| Dioctyl adipate | | | | | | | | 40.6 | |
| Pourability | + | + | + | + | + | + | + | + | + |
| Physical stability | + | + | + | + | + | + | + | + | + |

TABLE D

| | Percent by weight | | |
|---|---|---|---|
| Composition: | | | |
| 2,4-dichlorobenzoyl peroxide | 40 | | |
| p-Chlorobenzoyl peroxide | | 40 | |
| p-Methoxybenzoyl peroxide | | | 40 |
| Aerosil | 3 | 4 | 4 |
| Water | 1 | 7.5 | 7.5 |
| Dibutyl phthalate | 56 | 48.5 | 48.5 |
| Pourability | + | + | + |
| Physical stability | + | + | + |

What is claimed is:

1. A non-separating, stable composition consisting essentially of, in approximate parts by weight:
(a) 20 to 60 parts of dibenzoyl peroxide or dibenzoyl peroxide having one or more substituents selected from halogen, lower alkyl or lower alkoxy;
(b) up to 20 parts of water;
(c) a hydrophobic reaction product of a pyrogenic silica with dimethyl dichlorosilane in an amount sufficient to prevent the composition from physically separating into its components, the composition having at least 2 parts of silica; and
(d) the remainder being a chemically inert plasticizer.

2. A composition according to claim 1 wherein the composition contains up to 2 parts by weight of a dye or pigment with which the active oxygen content of the peroxide in the composition remains substantially constant.

3. A non-separating, stable and pourable composition consisting essentially of, in approximate parts by weight:
(a) 40 parts of dibenzoyl peroxide, 2,4-dichlorobenzoyl peroxide, p-chlorobenzoyl peroxide or p-methoxybenzoyl peroxide;
(b) up to 16 parts of water;
(c) 2 to 6 parts of a hydrophobic reaction product of a pyrogenic silica with dimethyl dichlorosilane; and
(d) the remainder being a chemically inert plasticizer.

4. A non-separating, stable composition consisting essentially of, in approximate parts by weight:
(a) 40 parts of dibenzoyl peroxide, 2,4-dichlorobenzoyl peroxide, p-chlorobenzoyl peroxide or p-methoxybenzoyl peroxide;
(b) up to 16 parts of water;

(c) 2 to 6 parts of a hydrophobic reaction product of a pyrogenic silica with dimethyl dichlorosilane;
(d) up to 2 parts of a dye or pigment with which the active oxygen content of the peroxide in the composition remains substantially constant; and
(e) the remainder being a chemically inert plasticizer.

5. A non-separating, stable and pourable composition consisting essentially of, in approximate parts by weight:
(a) 50 parts of dibenzoyl peroxide;
(b) up to 10 parts of water;
(c) 2 to 6 parts of hydrophobic reaction product of a pyrogenic silica with dimethyl dichlorosilane; and
(d) the remainder being a chemically inert plasticizer.

6. A non-separating, stable and pourable composition consisting essentially of, in approximate parts by weight:
(a) 50 parts of dibenzoyl peroxide;
(b) up to 10 parts of water;
(c) 2 to 6 parts of hydrophobic reaction product of a pyrogenic silica with dichlorosilane;
(d) up to 1 part of a pigment or dye with which the active oxygen content of the peroxide in the composition remains substantially constant; and
(e) the remainder being a chemically inert plasticizer.

*7. A non-separating, stable composition consisting essentially of, in approximate parts by weight:*
*(a) 20 to 60 parts of dibenzoyl peroxide or dibenzoyl peroxide having one or more substituents selected from halogen, lower alkyl or lower alkoxy;*
*(b) up to 20 parts of water;*
*(c) a hydrophobic reaction product of a pyrogenic silica with a lower alkyl chlorosilane in an amount sufficient to prevent the composition from physically separating into its components, the composition having at least 2 parts of silica; and*
*(d) the remainder being a chemically inert plasticizer.*

*8. The composition of claim 7 wherein the hydrophobic reaction product is the reaction product of a pyrogenic silica and an alkyl chlorosilane wherein the alkyl groups are methyl, ethyl, n-propyl, iso-propyl, iso-butyl, n-butyl or tert. butyl.*

* * * * *